United States Patent [19]
Nilsen

[11] Patent Number: 6,138,202
[45] Date of Patent: Oct. 24, 2000

[54] OBJECT SPACE MANAGER CIRCUIT FOR OBTAINING ADDRESSES OF OBJECT HEADERS

[75] Inventor: Kelvin D. Nilsen, Ames, Iowa

[73] Assignee: Iowa State University Research Foundation, Inc., Ames, Iowa

[21] Appl. No.: 08/176,940

[22] Filed: Jan. 4, 1994

[51] Int. Cl.[7] .................................................. G06F 12/00
[52] U.S. Cl. ..................... 711/101; 707/206; 711/100; 711/102; 711/103; 711/104; 711/105; 711/150; 711/168; 712/208; 712/209; 712/210; 712/211
[58] Field of Search ........................... 364/200; 395/600, 395/650, 700, 477, 427, 474, 821, 840, 841; 707/206; 712/208–213; 711/100–105, 150, 168

[56] References Cited

U.S. PATENT DOCUMENTS

| | | | |
|---|---|---|---|
| 4,797,810 | 1/1989 | McEntee et al. | 395/600 |
| 4,853,842 | 8/1989 | Thatte et al. | 395/600 |
| 4,864,497 | 9/1989 | Lowry et al. | 395/650 |
| 4,907,151 | 3/1990 | Barlett | 395/600 |
| 5,088,036 | 2/1992 | Ellis et al. | 395/600 |
| 5,241,673 | 8/1993 | Schelvis | 395/600 |
| 5,274,804 | 12/1993 | Jackson et al. | 395/600 |
| 5,392,432 | 2/1995 | Engelstad et al. | 395/700 |
| 5,446,901 | 8/1995 | Owicki et al. | 395/700 |
| 5,485,613 | 1/1996 | Engelstad et al. | 395/650 |

*Primary Examiner*—Do Hyun Yoo
*Assistant Examiner*—Than Nguyen
*Attorney, Agent, or Firm*—Robert E. Malm

[57] ABSTRACT

The object space manager circuit is a device used in computer memory systems for determining the address of the first word of an object, given the address of any other word in the same object. It consists of a first-object-word encoding circuit, a memory circuit, and a first-object-word decoding circuit. The encoding circuit utilizes a hierarchical coding system to generate codes that relate the address of a first object word to any other object word. This particular coding system results in codes that are the same for particular ranges of object word addresses. The codes are stored in the memory circuit which permits the entry of a code at each address of a specified range of memory addresses to be accomplished simultaneously. The decoding circuit utilizes an input object-word address to retrieve the associated codes from the memory and then translates these codes into the address of the first object word.

17 Claims, 1 Drawing Sheet

FIG. 1

OBJECT SPACE MANAGER CIRCUIT FOR OBTAINING ADDRESSES OF OBJECT HEADERS

STATEMENT OF RIGHTS

The United States government has certain rights in this invention pursuant to Contract No. MIP-9010412 between the National Science Foundation and Iowa State University.

BACKGROUND OF INVENTION

One of the major trends of the last decade in computer science has been the increasing popularity of the "object-oriented" paradigm. While there is little consensus regarding the meaning of this term, any object-oriented system must be concerned with the allocation and maintenance of storage for "objects" where an "object" is data that share a particular attribute and occupy a contiguous region of memory. Objects are not permitted to overlap. "Live" objects are those needed in the computational process currently being performed by a computer system.

If all objects in a system are permanent, then there is no concern about memory management. The space assigned to each object at system start-up need never be reclaimed. In most real systems, however, live objects have varying lifetimes that cannot be predicted in advance. In such systems, some method of recognizing expired ("dead") objects and evicting them from memory is necessary if memory resources are to be conserved.

"Garbage" is a term of art in computer technology which refers to data stored in computer system memory that is no longer being used in the performance of an application program. "Garbage collection" is the process of locating data in dynamically-allocated memory that is no longer being used and reclaiming the memory to satisfy future allocation requests.

Since garbage collection greatly reduces low-level programming detail, it offers the potential of significant programmer productivity gains. By freeing programmers from this low-level detail, garbage collection encourages programmers and system designers to dedicate their intellectual efforts to higher-level pursuits, such as the design of fundamental algorithms, user interfaces, and general program functionality. Also, by eliminating many low-level programming concerns, garbage collection reduces the likelihood of programming errors. And finally, dynamic memory management based on copying-types of garbage-collection algorithms are capable of delivering much higher storage throughput than explicit allocation and allocation revocation, reference-count storage reclamation, and even stack allocation. Together these benefits of garbage collection combine to offer improved software functionality and reliability for lower development costs.

Garbage collection is accomplished by copying live objects that are stored in one region of memory to a second region, thereby leaving dead objects behind in the first region. When the copying process has been completed, the dead objects are disposed of, and the garbage-collecting process continues with the copying of live objects in the second region back to the first. An up-to-date list of live objects is maintained by the central processing unit and forwarded to the garbage-collecting facility at the start of each garbage-collection cycle.

The copying process requires that memory space be allocated to the objects being copied in the region of memory to which the objects are being transferred. The information needed for allocating memory space to objects is contained in the header (i.e. the first word) of each object. Thus, the garbage-collecting control unit must be able to access the header of each live object being transferred to another region of memory. This requirement poses a problem in the case of live objects that are discovered as a result of examining the objects on the CPU's list in that the object headers are not readily available.

The list of objects supplied by the CPU is essentially a list of pointers to addresses contained within live objects. Objects on the CPU's list may contain pointers to data within other objects and these "referenced" objects are also live and must also be copied even though they do not appear on the CPU's list of live objects. In order that garbage collecting may proceed expeditiously, it is necessary that pointers to data within objects be translatable into pointers to object headers.

BRIEF SUMMARY OF INVENTION

The object space manager circuit is a key circuit in the garbage-collecting control unit. It provides the means for deriving pointers to headers of objects from pointers to internal data of objects. The object space manager circuit comprises an encoding means that generates a first-object-word locator code for each memory cell in which an object is resident, a memory for storing the first-object-word locator codes for all memory cells in which objects are resident, and a first-object-word locating means which identifies the memory cell containing the header of an object by means of the first-object-word locator code for any memory cell occupied by the object.

A key element of the object space manager circuit is a memory circuit in which a data word can be entered into a block of word storage elements simultaneously, the size of the block being dynamically selectable. This memory circuit permits object locator codes to be installed in memory rapidly and efficiently thereby permitting garbage collection to occur without unduly delaying the performance of application programs.

Another key element is a coding means by which the address of the first word of an object can be represented by codes that require less memory on the average than would be required to store the first-object-word address itself at every object-word address. The coding means takes advantage of the fact that the probability of an object word being the N'th word from the beginning of an object string is a rapidly decreasing function of N. Consequently, a coding approach which associates shorter codes with object words nearer to the first-object words and longer codes with object words farther from the first-object-words results in an average code length that is significantly less than the address of an object word itself.

The coding means achieves its purpose by utilizing a hierarchical coding scheme in which object words with small N's are associated with short codes at a first level of encoding, object codes with large N's are associated with long codes at the highest level of encoding, and object codes with intermediate N's are associated with intermediate-length codes at intermediate levels of encoding.

DESCRIPTION OF THE PREFERRED EMBODIMENT

The preferred embodiment of the object space manager (OSM) circuit is a single VLSI circuit interfaced with DRAM memory by means of the "RAMBUS" communication channel which permits communication between memory and ASIC circuitry at a 500 MHz rate. In its minimal configuration, the OSM circuit supports 512K object locations. In its maximum configuration, it supports 8M object locations. Error control protects against single-bit memory errors in order to provide robust operation of the circuit.

The DRAMs for the "RAMBUS" environment are called "RDRAM" chips. Currently available "RDRAM" chips are organized as two large DRAM arrays, each holding 256K×9 bits. (A "RAMBUS" byte is 9 bits wide.) Accompanying each of the two DRAM arrays are 1K×9 bits sense amplifiers. The contents of the "RDRAM" are transferred in blocks between the "RDRAM" chip and its external "RAMBUS" controller via the "RAMBUS" communication channel. Although the "RAMBUS" communication channel transfers one byte every 2 ns, a typical "RAMBUS" controller assembles every 8 bytes into a block of 72 bits which is transferred every 16 ns.

The preferred embodiment of the OSM circuit includes two "RAMBUS" controller/"RDRAM" combinations. By using two distinct "RAMBUS" controller/"RDRAM" combinations, the OSM circuit is able to access two banks of memory in parallel.

Since the "RAMBUS" protocol transfers blocks of at most 256 9-bit bytes at a time, each "RDRAM" chip will be treated in the material that follows as a single DRAM array that contains 2K rows, each row containing 256×9=2,304 bits. Henceforth, aligned 256-byte segments of "RDRAM" memory will be referred to as "RDRAM" rows.

In its minimal configuration, the OSM circuit supports an "object memory" consisting of two semi-spaces, each semi-space having 512K addressable locations. A 20-bit address, the most significant bit being the semi-space identifier, can be used to identify each of the 512K addressable locations in a semi-space.

The purpose of the OSM circuit is to provide a means for determining the address A in object memory of the header of an object from the address B of any word in the object, where the object occupies all address locations between A and C, C being the address of the last word of the object, the numerical value of C always being equal to or greater than that of A.

The OSM circuit accomplishes its purpose by storing in a "code memory" a level-1 code, a level-2 code, and a level-3 code for each object word stored in object memory. If the binary representations of the header address A and the object word address B are $A_{18}A_{17}A_{16} \ldots A_0$ and $B_{18}B_{17B16} \ldots B_0$ respectively (ignoring for the moment the semi-space bits $A_{19}$ and $B_{19}$), then the codes are as follows (the "X's" stand for "don't care"):

level-1 code: $1A_5A_4 \ldots A_0$; $A_{18}A_{17} \ldots A_6 = B_{18}B_{17} \ldots B_6$
$0X_5X_4 \ldots X_0$; otherwise level-2 code: $1A_{12}A_{11} \ldots A_0$; $A_{18}A_{17} \ldots A_6 \neq B_{18}B_{17} \ldots B_6$ and $A_{18}A_{17} \ldots A_{13} = B_{18}B_{17} \ldots B_{13}$
$0X_{12}X_{11} \ldots X_0$; otherwise level-3 code: $1A_{18}A_{17} \ldots A_0$; $A_{18}A_{17} \ldots A_{13} \neq B_{18}B_{17} \ldots B_{13}$
$0X_{18}X_{17} \ldots X_0$; otherwise The most significant bit in the level-1, level-2, and level-3 codes is called the "valid data" bit. A "0" indicates that the word is invalid while a "1" indicates that the word is valid.

The level-1 codes for all addresses in a semi-space must be stored, each address being assigned a slot in a level-1 group.

The level-2 codes need only be stored for all level-1 groups defined by the 13 most significant bits after the most significant bit (the bit that identifies the semi-space) of an object memory address since the codes are the same for all addresses within a level-1 group. Each level-2 code occupies a slot in a level-2 group, there being a one-to-one correspondence between the level-2 slots and the level-1 groups.

The level-3 codes need only be stored for all level-2 groups defined by the 6 most significant bits after the most significant bit of an object memory address since the codes are the same for all addresses within a level-2 group. Each level-3 code occupies a slot in the single level-3 group, there being a one-to-one correspondence between the level-3 slots and the level-2 groups.

The header of an object having a word stored at address B is determined by retrieving from code memory as needed the level-1 code in the slot corresponding to address B, the level-2 code in the slot corresponding to the level-1 group containing B, and the level-3 code in the slot corresponding to the level-2 group containing B.

If the "valid data" bit of the level-1 code equals 1, the header address is a combination of the level-1 code without the "valid data" bit and the most significant bits of B: $B_{18}B_{17} \ldots B_6A_5A_4 \ldots A_0$.

If the "valid data" bit for the level-1 code is 0 and the "valid data" bit for the level-2 code is 1, the header address is a combination of the level-2 code without the "valid data" bit and the most significant bits of B: $B_{18}B_{17} \ldots B_{13}A_{12}A_{11} \ldots A_0$.

If the "valid data" bits for both level-1 and level-2 codes are 0 and the "valid data" bit for the level-3 code is 1, then the header address is the level-3 code without the "valid data" bit.

If the "valid data" bits for all three levels is 0, then there is no header address corresponding to the codes.

The number of groups, the number of slots per group for holding codes, and the number of bits per slot as a function of level is as follows:

| Level | No. of Groups | No. of Slots per Group | Bits per Slot |
| --- | --- | --- | --- |
| 1 | 8192 | 64 | 7 |
| 2 | 64 | 128 | 14 |
| 3 | 1 | 64 | 19 |

The OSM circuit supports two semi-spaces, each representing the same total number of object locations. A single 512-Kbyte "RDRAM" chip is capable of holding all of the codes required to represent level-1 and level-2 of the OSM hierarchy. In order to support minimum latency and high throughput, the "RDRAM" chips associated with each semi-space are placed on different "RAMBUS"s. The level-2 memory associated with the first semi-space is placed in the same "RDRAM" chip as the level-1 memory associated with the second semi-space, and vice versa. This arrangement allows the two levels of each semi-space to be accessed in parallel.

The number of bits in each level-1 group is 448 (see table above) but this number can be compressed to 385, as will be shown below.

The number of bits in a level-2 group is 1,792. This number could also be compressed but compression does not seem worthwhile for the preferred embodiment since the memory capacity required to store the level-2 codes is a relatively small fraction of the memory capacity required to store even the compressed level-1 codes. Another reason for not compressing the level-2 codes is that the uncompressed level-2 codes align easily with the "RDRAM" chip's natural boundaries.

The level-3 codes are also not compressed since the memory capacity required to store them is even smaller than that required to store the level-2 codes.

To simplify the circuitry required to map OSM addresses to level-1 memory, every set of 32 level-1 groups is aligned within seven "RDRAM" cache lines as shown below:

| Group | Bytes | "RDRAM" Row | Group | Bytes | "RDRAM" Row |
|---|---|---|---|---|---|
| 0 | 0–47 | 0 | 15 | 0–47 | 3 |
| 1 | 48–95 | 0 | 16 | 48–95 | 3 |
| 2 | 96–143 | 0 | 17 | 96–143 | 3 |
| 3 | 144–191 | 0 | 18 | 144–191 | 3 |
| 4 | 182–239 | 0 | 19 | 182–239 | 3 |
| — | 240–255 | 0 | — | 240–255 | 3 |
| 5 | 0–47 | 1 | 20 | 0–47 | 4 |
| 6 | 48–95 | 1 | 21 | 48–95 | 4 |
| 7 | 96–143 | 1 | 22 | 96–143 | 4 |
| 8 | 144–191 | 1 | 23 | 144–191 | 4 |
| 9 | 182–239 | 1 | 24 | 182–239 | 4 |
| — | 240–255 | 1 | — | 240–255 | 4 |
| 10 | 0–47 | 2 | 25 | 0–47 | 5 |
| 11 | 48–95 | 2 | 26 | 48–95 | 5 |
| 12 | 96–143 | 2 | 27 | 96–143 | 5 |
| 13 | 144–191 | 2 | 28 | 144–191 | 5 |
| 14 | 182–239 | 2 | 29 | 182–239 | 5 |
| — | 240–255 | 2 | — | 240–255 | 5 |
|  |  |  | 30 | 0–47 | 6 |
|  |  |  | 31 | 48–95 | 6 |
|  |  |  | — | 96–255 | 6 |

The "Bytes" column refers to the 9-bit bytes that are utilized in the "RDRAM"s.

In total, level-1 codes occupy 7×(8,192/32)=1,792 "RDRAM" rows. Given the number of a level-1 group, the OSM circuit masks off the five least significant bits to determine which 7-row "RDRAM" segment holds the relevant group. A simple table look-up maps the five least-significant bits to the group number within the segment and identifies the position of the specified group within the "RDRAM" row.

Remaining in the "RDRAM" are 2,048−1,792=256 rows to hold the level-2 codes. Only 64 of these rows are actually needed. Each level-2 code occupies 14 bits, and four codes are packed into each 72-bit segment of an "RDRAM" row, as indicated below:

| Type of Data | No. of Bits | Bits in "RDRAM" Row |
|---|---|---|
| Code 1 | 14 | 0–13 |
| Code 2 | 14 | 14–27 |
| Code 3 | 14 | 28–41 |
| Code 4 | 14 | 42–55 |
| — | 8 | 56–63 |
| Error Control | 8 | 64–71 |
| . | . | . |
| . | . | . |
| . | . | . |
| Code 124 | 14 | 2,232–2,245 |
| Code 125 | 14 | 2,246–2,259 |
| Code 126 | 14 | 2,260–2,273 |
| Code 127 | 14 | 2,274–2,287 |
| — | 8 | 2,288–2,295 |
| Error Control | 8 | 2,296–2,303 |

In order to achieve high throughput, the OSM circuit utilizes four register arrays, each of which can hold an entire level-1 or level-2 group of codes. Two of the register arrays are used to store level-1 codes. The other two register arrays are used to store level-2 codes. Two more register arrays are used to store the level-3 codes associated with the two semi-spaces.

The OSM circuit permits a level-1 or level-2 group of codes or a level-3 semi-space that resides in a register array to be designated as bank-0 or bank-1, the binary digits being referred to as the "bank index". Bank-0 codes may be placed in either of the same level register arrays and similarly for bank-1 codes. The identities of the register arrays to which the bank codes are assigned are stored in bank index registers. The number of the code group occupying each register array is maintained in a register associated with the register array.

The OSM circuit also includes two segmented input/output register arrays which interface the level-1 and level-2 register arrays with the "RDRAM"s.

Figure 1:
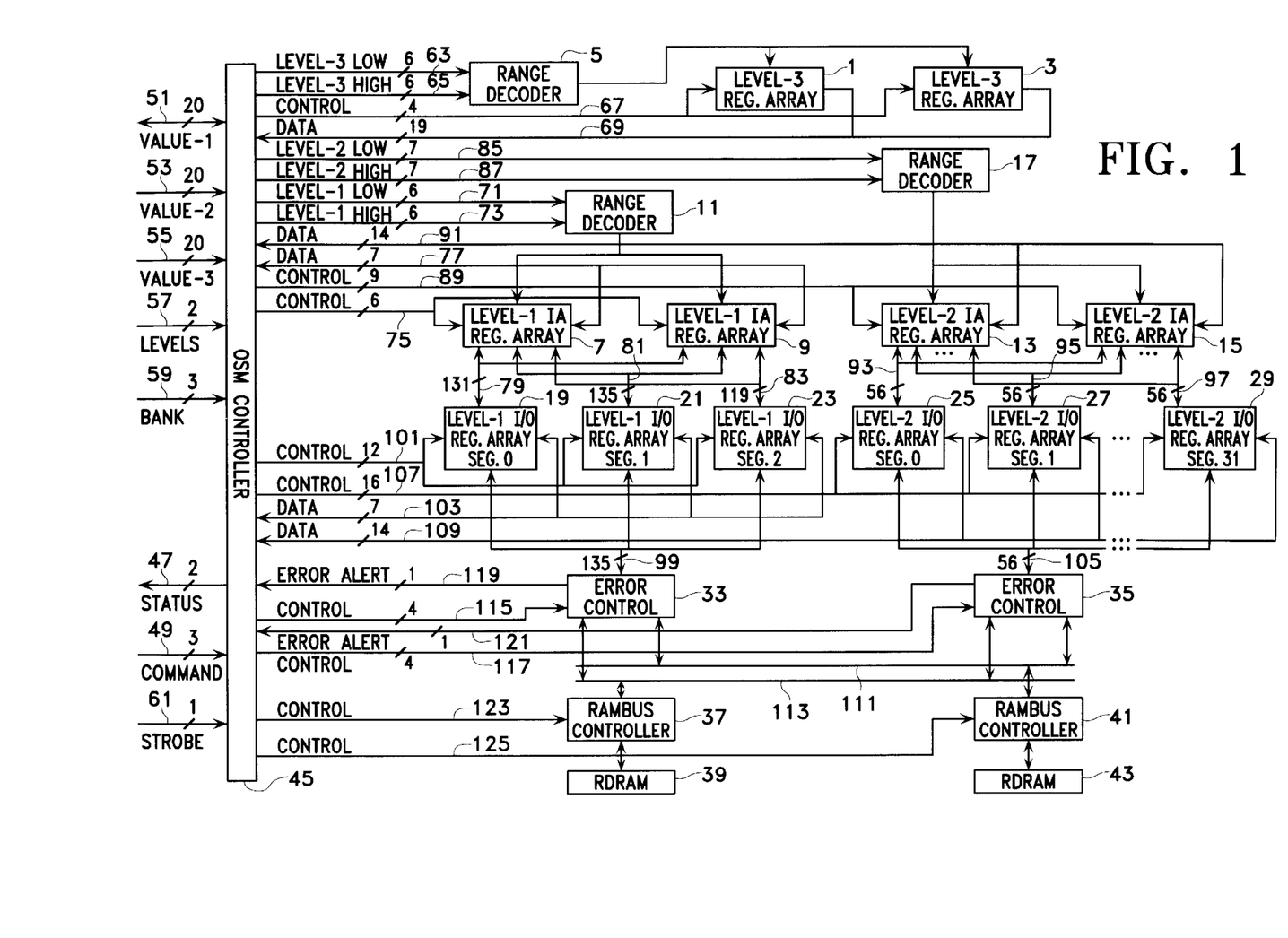
FIG. 1 is a block diagram of the object space manager circuit.

The block diagram of the preferred embodiment of the OSM circuit is shown in FIG. 1. The OSM circuit is comprised of level-3 register arrays 1 and 3, range decoder 5 associated with the level-3 register arrays, level-1 "immediately available" (IA) register arrays 7 and 9, range decoder 11 associated with the level-1 IA register arrays, level-2 IA register arrays 13 and 15, range decoder 17 associated with the level-2 IA register arrays, input/output (I/O) register array segments 19, 21, and 23 which interface with the level-1 IA register arrays, 32 I/O register array segments (typified by I/O register array segments 25, 27, and 29) which interface with the level-2 IA register arrays, error control circuit 33 which interfaces with the level-1 I/O register array segments 19, 21 and 23, error control circuit 35 which interfaces with the 32 level-2 I/O register array segments typified by array segments 25, 27, and 29, "RAMBUS" controller 37 which interfaces the error control circuits 33 and 35 with "RDRAM" 39, "RAMBUS" controller 41 which interfaces error control circuits 33 and 35 with "RDRAM" 43, and OSM controller 45 which provides internal operational control of the OSM circuit.

Utilization of the OSM circuit by a user is exercised by reading and writing to the OSM controller 45 by means of the lines indicated at the left of the OSM controller.

The "status" lines 47 consist of two lines carrying a 2-bit code and provide information as to the status of the OSM circuit. A 00 code indicates that the OSM circuit is ready to accept a new command. A 01 code indicates that the OSM circuit is engaged in performing operations associated with a previous command. A 10 code indicates that an error occurred during a memory operation, that as a result of the error the previous command could not be properly executed, and that the OSM circuit is ready to accept a new command.

The OSM circuit implements a number of commands denoted by the names LOAD, RELOAD, UPDATE, WRITEBACK, REQUEST, FETCH, and RESET. The "command" lines 49 provide the means for entering a 3-bit code which identifies the LOAD (000), RELOAD (001), UPDATE (010), WRITEBACK (011), REQUEST (100), FETCH (101), and RESET (110) commands.

The "value-1" lines 51 provide the means for entering a 20-bit memory address and receiving the level-1 code, the level-2 code, the level-3 code, or the 20-bit header address of an object.

The "value-2" lines 53 and the "value-3" lines 55 provide the means for entering a second and third 20-bit memory address. The "value-2" and "value-3" inputs could, for example, be the addresses of the beginning and ending words in some portion of a level-1, level-2, or level-3 group that is to be overwritten with "value-1".

The "levels" lines 57 provide the means for entering a 2-bit code designating either a single level or all levels for processing. The codes are assigned as follows:

| "Levels" Code | Code Group Levels |
|---|---|
| 00 | all |
| 01 | 1 |
| 10 | 2 |
| 11 | 3 |

The OSM circuit minimally accepts the seven command inputs identified above. The operations performed by the OSM circuit in response to each of these seven commands are as follows:

LOAD(levels,bank,value-1,value-2)

This command, when either level-1 or level-2 is specified, causes the register array for the specified level that is assigned to the specified bank to be assigned the code group numbered value-1 and to be loaded with zeros unless any of the register arrays for the specified level already contains the specified code group, in which case the specified register array is not initialized. In the case of level-3, the bank parameter serves to identify one of the two semi-spaces and this command causes the register array assigned to the designated semi-space to be loaded with zeros. When the "levels" parameter specifies all levels, the above process is performed for all levels.

RELOAD(levels,bank,value-1,value-2)

This command causes the code group numbered value-1 to be retrieved from code memory and loaded into the register array assigned to the specified bank. If the designated code group already resides in one of the level-1 or level-2 register arrays, the command is not executed. Instead, the register array containing the designated code group is assigned to the specified bank. If the "levels" parameter specifies all levels, the above process is performed for levels 1 and 2 with value-1 designating the level-1 group number and value-2 designating the level-2 group number. The operation is not defined for level-3.

UPDATE(levels,bank,value-1,value-2,value-3)

This command, in the cases of level-1 and level-2, causes the registers with numbers from value-2 to value-3, in the register arrays assigned to bank, to be overwritten with the value value-1. In the case of level-3, the bank parameter serves to identify one of the two semi-spaces and this command causes the registers with numbers from value-2 to value-3, in the register array assigned to the designated semi-space, to be overwritten with the value value-1. This command may also be used to overwrite all levels of registers simultaneously in which case the register ranges and the overwriting values are determined from the address value-1 of the object header and the address value-2 of the last word of the object.

WRITEBACK(levels, bank)

This command causes the contents of the register array assigned to the specified bank to be written into code memory. This command is not defined for level-3.

REQUEST(levels, value-1, value-2)

This command makes the code for the specified level numbered and stored in slot value-2 of group value-1 readily available for reading. If the desired code is lodged in one of the register arrays, the code is readily accessible and no further action is required. If the desired code is not in one of the register arrays, it is retrieved from code memory into an I/O register array. Up to three sequential requests may be made at a time if each request pertains to a different level. If value-1 equals 0, this command causes the level-1, level-2, and level-3 codes corresponding to a code address value-1 to be retrieved and the address of the header to be determined. The level-1 code in the group and slot corresponding to the address specified by the value-1 parameter and the level-2 code in the group and slot corresponding to the level-1 group containing the specified address are retrieved from register arrays if the codes already occupy register arrays and from code memory if they don't. The level-3 code in the semi-space and slot corresponding to the level-2 group containing the specified address is retrieved from the level-3 code memory.

FETCH(levels)

This command provides the data previously requested by means of the REQUEST command at the output terminals of the OSM circuit.

RESET

This command causes the OSM circuit to be initialized.

When the "levels" code 00 is used in the UPDATE command, "value-2" is the address A of the header and "value-3" is the address C of the last word of a new object to be stored in the OSM circuit. The occurrence of the 00 code on the "levels" lines 57 causes the quantities level-1 low, level-1 high, level-2 low, level-2 high, level-3 low, and level-3 high to be determined as described below.

The integers $A_{18}A_{17} \ldots A_{13}$ and $C_{18}C_{17} \ldots C_{13}$ are the numbers associated with the level-2 groups containing A and C respectively. The integers $A_{12}A_{11} \ldots A_6$ and $C_{12}C_{11} \ldots C_6$ are the numbers associated with the level-1 group containing A and C respectively. The integers $A_5A_4 \ldots A_0$ and $C_5C_4 \ldots C_0$ are the numbers associated with the slots containing A and C respectively within a level-1 group.

If $A_{18}A_{17} \ldots A_{13} = C_{18}C_{17} \ldots C_{13}$ and $A_{12}A_{11} \ldots A_6 = C_{12}C_{11} \ldots C_6$:

$$\text{level-1 low} = A_5A_4 \ldots A_0$$

$$\text{level-1 high} = C_5C_4 \ldots C_0$$

If $A_{18}A_{17} \ldots A_{13} \neq C_{18}C_{17} \ldots C_{13}$ or $A_{12}A_{11} \ldots A_6 \neq C_{12}C_{11} \ldots C_6$:

$$\text{level-1 low} = A_5A_4 \ldots A_0$$

$$\text{level-1 high} = 1\,1\,1\,1\,1\,1$$

Let $D = A + 64$ and $E = A + 8192$.

If $A_{18}A_{17} \ldots A_{13} \neq C_{18}C_{17} \ldots C_{13}$ or $A_{12}A_{11} \ldots A_6 \neq C_{12}C_{11} \ldots C_6$ and if $D_{18}D_{17} \ldots D_{13} = C_{18}C_{17} \ldots C_{13}$:

$$\text{level-2 low} = D_{12}D_{11} \ldots D_6$$

$$\text{level-2 high} = C_{12}C_{11} \ldots C_6$$

If $A_{18}A_{17} \ldots A_{13} \neq C_{18}C_{17} \ldots C_{13}$ or $A_{12}A_{11} \ldots A_6 \neq C_{12}C_{11} \ldots C_6$ and if $D_{18}D_{17} \ldots D_{13} \neq C_{18}C_{17} \ldots C_{13}$:

$$\text{level-2 low} = D_{12}D_{11} \ldots D_6$$

$$\text{level-2 high} = 1\,1\,1\,1\,1\,1$$

$$\text{level-3 low} = E_{18}E_{17} \ldots E_{13}$$

$$\text{level-3 high} = C_{18}C_{17} \ldots C_{13}$$

The OSM circuit is so-arranged that if operations involving several code group levels are to be performed, they are performed in parallel, thereby producing results as quickly as possible.

The three "bank" lines 59 provide the means for selecting up to two banks and a semi-space in accordance with a 3-bit code. The first bit of the code specifies the bank when levels equals 1 or 2 and the semi-space when levels equals 3. The first bit specifies the bank for level-1, the second bit specifies the bank for level-2, and the third bit specifies the semi-space when levels equal 0.

The user causes the OSM circuit to execute a command by placing appropriate signals on lines 49, 51, 53, 55, 57, and 59 when either the 00 or 10 codes appear on status lines 47 and then raising the "strobe" line 61 to a high level. The input signals are held steady until the OSM circuit acknowledges the command by placing the 01 code on status lines 47. The OSM circuit maintains the 01 code on status lines 47 until it has completed all operations associated with the command. In the case of the FETCH command, the falling edge of the least significant bit of the status signal serves to strobe the result, which appears on the value-1 lines, into a register provided by the user.

The OSM controller 45 interfaces with the other circuits that comprise the OSM circuit by means of the lines shown on the right of the OSM controller.

The "level-3 low" lines 63 and the "level-3 high" lines 65 carry binary codes that are transformed by the range decoder 5 into 64 output signals which feed into the two level-3 register arrays 1 and 3. Each of the level-3 register arrays consists of 64 19-bit registers, one for each of the level-2 groups.

Each 1-bit storage element in a register has an "input" terminal, an "output" terminal, a "strobe" terminal, and a "reset" terminal. A pulse on the "strobe" terminal causes the bit represented by the signal on the "input" terminal to be stored in the storage element. The "output" terminal provides access to the bit stored in the storage element. A pulse on the "reset" terminal causes a 0 to be stored in the storage element.

One of the control lines 67 carries a binary "read/write" signal (0, "read"; 1, "write"), the second carries a binary "array select" signal (0, register array 1; 1, register array 3), the third carries a "strobe" signal, and a fourth carries a "reset" signal. The "array select" signal is the semi-space indicating bit that is the most significant bit of each address in object memory.

The 64 range decoder outputs entering register array 1 are individually AND'ed with the "read/write" signal, the inverse of the "array select" signal, and the "strobe" signal, and the resulting signals individually clock the 64 19-bit registers that make up register array 1. The clock signals cause the 19 binary signals appearing on the data lines 69 to be written into the register array 1 registers numbered from level-3 low to level-3 high.

Similarly, the 64 range decoder outputs entering register array 3 are individually AND'ed with the "read/write" signal, the "select" signal, and the "strobe" signal, and the resulting signals individually clock the 64 19-bit registers that make up register array 3. The clock signals cause the 19 binary signals appearing on the data lines 69 to be written into the register array 3 registers numbered from level-3 low to level-3 high.

A "read/write" signal equal to 0 results in the 19 bits from a selected register in a selected register array appearing on the data lines 69. When the "read" operation is employed, both the "level-3 low" lines 63 and the "level-3 high" lines 65 carry 6 bits that specify a level-2 group. Under these circumstances only one of the 64 range decoder outputs is high. The range decoder outputs are associated with the 64 registers in each register array on a one-to-one basis. Each of the 64 range decoder outputs is AND'ed individually with the signals on the 19 output lines of each of the associated registers in register array 1 and the resulting output signals are AND'ed with the inverse of the "read/write" signal and the inverse of the "array select" signal. The 64 register sets of signals resulting from this last logical operation are all connected to the data lines 69.

Similarly, each of the 64 range decoder outputs is AND'ed individually with the signals on the 19 output lines of each of the associated registers in register array 3 and the resulting output signals are AND'ed with the inverse of the "read/write" signal and the "array select" signal. The 64 register sets of signals resulting from this last logical operation are also all connected to the data lines 69.

When the "array select" signal equals 0, the signals from one and only one of the registers in register array 1 and from none of the registers in register array 3 will appear on data lines 69. When the "array select" signal equals 1, the signals from one and only one of the registers in register array 3 and from none of the registers in register array 1 will appear on data lines 69.

A pulse on the "reset" line clears all of the registers in register array 1 or 3 that is selected by the "array select" signal.

The level-1 IA register arrays 7 and 9 each consist of 64 7-bit registers, some of the 1-bit storage elements of which are virtual. The virtual storage elements simulate the presence of real storage elements having stored 0's with voltage levels corresponding to stored 0's. The level-2 IA register arrays 13 and 15 each consist of 128 14-bit registers, none of the storage elements of which are virtual.

Each real 1-bit storage element in a register has an "input" terminal, an "output" terminal, a "strobe" terminal, and a "reset" terminal. A pulse on the "strobe" terminal causes the bit represented by the signal on the "input" terminal to be stored in the storage element. The "output" terminal provides access to the bit stored in the storage element. A pulse on the "reset" terminal causes a 0 to be stored in the storage element. The virtual storage elements have only "output" terminals.

Virtual storage elements may be used in place of real storage elements in many of the level-1 registers because many of the level-1 codes do not require 6 bits to specify the location of the object header.

A level-1 code consists of a "valid data" bit and a binary number representing the offset of the object header from the 0'th slot in a level-1 group. A code in the 0'th slot can only refer to an object header in the same slot and consequently it is unnecessary to specify the offset. Thus, the code in the 0'th slot requires only a "valid data" bit.

A code in the 1'th slot can specify a header in either the 0'th or 1'th slot and thus requires 1 bit to specify the offset. A complete code consists of 2 bits—the "valid data" bit and the "offset" bit.

A code in the 2'th slot can specify a header in either the 0'th, the 1'th, or the 2'th slot and thus requires 2 bits to specify the offset. The specification of a complete code in this case requires 3 bits.

The number of bits required to specify the level-1 codes for the 64 slots in a group are given below.

| Slot | No. of Bits | Bit Nos. | Slot | No. of Bits | Bit Nos. |
|---|---|---|---|---|---|
| First Segment | | | Second Segment (cont.) | | |
| 0 | 1 | 0 | 32 | 7 | 30–36 |
| 1 | 2 | 1–2 | 33 | 7 | 36–43 |

-continued

| Slot | No. of Bits | Bit Nos. | Slot | No. of Bits | Bit Nos. |
|---|---|---|---|---|---|
| 2 | 3 | 3–5 | 34 | 7 | 44–50 |
| 3 | 3 | 6–8 | 35 | 7 | 51–57 |
| 4 | 4 | 9–12 | 36 | 7 | 58–64 |
| 5 | 4 | 13–16 | 37 | 7 | 65–71 |
| 6 | 4 | 17–20 | 38 | 7 | 72–78 |
| 7 | 4 | 21–24 | 39 | 7 | 79–85 |
| 8 | 5 | 25–29 | 40 | 7 | 86–92 |
| 9 | 5 | 30–34 | 41 | 7 | 93–99 |
| 10 | 5 | 35–39 | 42 | 7 | 100–106 |
| 11 | 5 | 40–44 | 43 | 7 | 107–113 |
| 12 | 5 | 45–49 | 44 | 7 | 114–120 |
| 13 | 5 | 50–54 | 45 | 7 | 121–127 |
| 14 | 5 | 55–60 | 46 | 7 | 128–134 |
| 15 | 5 | 61–64 | | Third Segment | |
| 16 | 6 | 65–70 | 47 | 7 | 0–6 |
| 17 | 6 | 71–77 | 48 | 7 | 7–13 |
| 18 | 6 | 78–82 | 49 | 7 | 14–20 |
| 19 | 6 | 83–88 | 50 | 7 | 21–27 |
| 20 | 6 | 89–94 | 51 | 7 | 28–34 |
| 21 | 6 | 95–100 | 52 | 7 | 35–41 |
| 22 | 6 | 101–106 | 53 | 7 | 42–48 |
| 23 | 6 | 107–112 | 54 | 7 | 49–55 |
| 24 | 6 | 113–118 | 55 | 7 | 56–62 |
| 25 | 6 | 119–124 | 56 | 7 | 63–69 |
| 26 | 6 | 125–130 | 57 | 7 | 70–76 |
| | Second Segment | | 58 | 7 | 77–83 |
| 27 | 6 | 0–5 | 59 | 7 | 84–90 |
| 28 | 6 | 6–11 | 60 | 7 | 91–97 |
| 29 | 6 | 12–17 | 61 | 7 | 98–104 |
| 30 | 6 | 18–23 | 62 | 7 | 105–111 |
| 31 | 6 | 24–29 | 63 | 7 | 112–118 |

For each slot in a group there is an associated 7-bit register having the same number as the slot. The number of real storage elements in each register is indicated by the "No. of Bits" in the above table. The remaining storage elements in each register are virtual.

The "level-1 low" lines 71 and the "level-1 high" lines 73 carry binary codes that are transformed by the range decoder 11 into 64 output signals which feed into the two level-1 register arrays 7 and 9.

One of the control lines 75 carries a binary "read/write" signal (0, "read"; 1, "write"), a second carries a binary "array select" signal (0, register array 7; 1, register array 9), the third carries an "strobe" signal, and the fourth carries a "reset" signal. The 64 range decoder outputs entering register array 7 are individually AND'ed with the "read/write" signal, the inverse of the "array select" signal, and the "strobe" signal, and the resulting signals individually clock the 64 7-bit registers that make up register array 7. The clock signals cause the 7 binary signals appearing on the data lines 77 to be written into the register array 7 registers numbered from level-1 low to level-1 high. Data lines 77 do not connect to any virtual storage elements in the registers of level-1 register array 7. Thus, only the data on the data lines 77 that pertain to real storage elements is written into the registers.

Similarly, the 64 range decoder outputs entering register array 9 are individually AND'ed with the "read/write" signal, the "array select" signal, and the "strobe" signal, and the resulting signals individually clock the 64 7-bit registers that make up register array 9. The clock signals cause the 7 binary signals appearing on the data lines 77 to be written into the register array 9 registers numbered from level-1 low to level-1 high.

A "read/write" signal equal to 0 results in the 7 bits from a selected register in a selected register array appearing on the data lines 77. When the "read" operation is employed, both the "level-1 low" lines 71 and the "level-1 high" lines 73 carry 6 bits that specify a slot in a level-1 group. Under these circumstances only one of the 64 range decoder outputs is high. The range decoder outputs are associated with the 64 registers in each register array on a one-to-one basis. Each of the 64 range decoder outputs is AND'ed individually with the signals on the 7 output lines of each of the associated registers in register array 7 and the resulting output signals are AND'ed with the inverse of the "read/write" signal and the inverse of the "array select" signal. The 64 register sets of signals resulting from this last logical operation are all connected to the data lines 77.

Similarly, each of the 64 range decoder outputs is AND'ed individually with the signals on the 7 output lines of each of the associated registers in register array 9 and the resulting output signals are AND'ed with the inverse of the "read/write" signal and the "array select" signal. The 64 register sets of signals resulting from this last logical operation are also all connected to the data lines 77.

When the "array select" signal equals 0, the signals from one and only one of the registers in register array 7 and from none of the registers in register array 9 will appear on data lines 77. When the "array select" signal equals 1, the signals from one and only one of the registers in register array 9 and from none of the registers in register array 7 will appear on data lines 77.

A pulse on the "reset" line clears all of the registers in register array 7 or 9 that is selected by the "array select" signal.

Each of the 131 lines 79 entering the level-1 IA register arrays 7 and 9 connects through a series-connected single-pole, single-throw (SPST) switch and a single-pole, double-throw (SPDT) switch to the input and output terminals of each of the real storage elements of registers 0 through 26. Each of the 135 lines 81 entering the level-1 IA register arrays 7 and 9 connects in the same way to the real storage elements of registers 27 through 46. And each of the 119 lines 83 entering the level-1 IA register arrays 7 and 9 connects in the same way to the real storage elements of registers 47 through 63.

The "read/write" signal carried by one of the control lines 75 operate the SPDT switches in register arrays 7 and 9 thereby causing either the input or the output terminals of the real storage elements of the registers to be connected to the SPST switches.

The control lines 75 also include two lines carrying a 2-bit "segment select" signal (01, segment 0; 10, segment 1; 11, segment 2). The "segment select" signal in combination with the "array select" signal causes one of the six sets of SPST switches in the register arrays 7 and 9, one set for each segment, to close thereby connecting either the input or the output terminals of one segment of either register array 7 or register array 9 to one of the sets of lines 79, 81, or 83. Thus, data can be read from or written to the segment-0 registers of either register array 7 or register array 9 using data lines 79. Similarly, data can be read from or written to the segment-1 registers of either register array 7 or register array 9 using data lines 81. And data can be read from or written to the segment-2 registers of either register array 7 or register array 9 using data lines 83.

The level-2 register arrays 13 and 15 are each comprised of 32 segments, each segment consisting of four 14-bit registers.

The "level-2 low" lines 85 and the "level-2 high" lines 87 carry binary numbers that are transformed by the range decoder 17 into 128 output signals which feed into the two level-2 register arrays 13 and 15.

One of the control lines 89 carries a binary "read/write" signal (0, "read"; 1, "write"), a second carries a binary "array select" signal (0, register array 13; 1, register array 15), the third carries a "strobe" signal, and the fourth carries a "reset" signal. The 128 range decoder outputs entering register array 13 are individually AND'ed with the "read/write" signal, the inverse of the "array select" signal, and the "strobe" signal, and the resulting signals individually clock the 128 14-bit registers that make up register array 13. The clock signals cause the 14 binary signals appearing on the data lines 91 to be written into the register array 13 registers numbered from level-2 low to level-2 high.

Similarly, the 128 range decoder outputs entering register array 15 are individually AND'ed with the "read/write" signal, the "array select" signal, and the "strobe" signal, and the resulting signals individually clock the 128 14-bit registers that make up register array 15. The clock signals cause the 14 binary signals appearing on the data lines 91 to be written into the register array 15 registers numbered from level-2 low to level-2 high.

A "read/write" signal equal to 0 results in the 14 bits from a selected register in a selected register array appearing on the data lines 91. When the "read" operation is employed, both the "level-2 low" lines 85 and the "level-2 high" lines 87 carry 7 bits that specify a level-1 group. Under these circumstances only one of the 128 range decoder outputs is high. The range decoder outputs are associated with the 128 registers in each register array on a one-to-one basis. Each of the 128 range decoder outputs is AND'ed individually with the signals on the 14 output lines of each of the associated registers in register array 13 and the resulting output signals are AND'ed with the inverse of the "read/write" signal and the inverse of the "array select" signal. The 128 register sets of signals resulting from this last logical operation are all connected to the data lines 91.

Similarly, each of the 128 range decoder outputs is AND'ed individually with the signals on the 14 output lines of each of the associated registers in register array 15 and the resulting output signals are AND'ed with the inverse of the "read/write" signal and the "array select" signal. The 128 register sets of signals resulting from this last logical operation are also all connected to the data lines 91.

When the "array select" signal equals 0, the signals from one and only one of the registers in register array 13 and from none of the registers in register array 15 will appear on data lines 91. When the "array select" signal equals 1, the signals from one and only one of the registers in register array 15 and from none of the registers in register array 13 will appear on data lines 91.

A pulse on the "reset" line clears all of the registers in register array 13 or 15 that is selected by the "array select" signal.

Each of the 56 lines 93 entering the level-2 IA register arrays 13 and 15 connects through a series-connected single-pole, single-throw (SPST) switch and a single-pole, double-throw (SPDT) switch to the input and output terminals of each of the storage elements of registers 0 through 3. Each of the 56 lines 95 entering the level-2 IA register arrays 13 and 15 connects in the same way to the storage elements of registers 4 through 7. This wiring format continues for succeeding groups of four registers (not shown in FIG. 1), concluding with the connection of the 56 lines 97 to the storage elements of registers 124 through 127 in the level-2 IA register arrays 13 and 15.

The "read/write" signal carried by one of the control lines 89 operate the SPDT switches in register arrays 13 and 15 thereby causing either the input or the output terminals of the storage elements of the registers to be connected to the SPST switches.

The control lines 89 also include five lines carrying a 5-bit "segment select" signal ($N_4N_3N_2N_1N_0$=segment $N_4 2^4 + N_3 2^3 + N_2 2^2 + N_1 2^1 + N_0 2^0$). The "segment select" signal in combination with the "array select" signal causes one of the 32 sets of SPST switches in the register arrays 13 and 15, one set for each segment, to close thereby connecting either the input or output terminals of one segment of either register array 13 or register array 15 to one of the 32 sets of lines connecting to the register arrays 13 and 15 and typified by lines 93, 95, or 97. Thus, data can be read from or written to the segment-0 registers of either register array 13 or register array 15 using data lines 93. Similarly, data can be read from or written to the segment-1 registers of either register array 13 or register array 15 using data lines 95. And data can be read from or written to the registers of any other segment of either register array 13 or register array 15 using the sets-of-56 data lines extending from data lines 95 to and including data lines 97.

The three range decoders 5, 11, and 17 are implemented with conventional logic gates in accordance with the specifications given below. The n-bit "low" and "high" parameters are decoded conventionally into the N($=2^n$)-bit numbers L ($=L_{N-1}L_{N-2} \ldots L_0$) or H ($=H_{N-1}H_{N-2} \ldots H_0$) respectively as shown below.

| "low" or "high" | L or H respectively |
|---|---|
| 0....000 | 0....00000001 |
| 0....001 | 0....00000010 |
| 0....010 | 0....00000100 |
| 0....011 | 0....00001000 |
| 0....100 | 0....00010000 |
| 0....101 | 0....00100000 |
| 0....110 | 0....01000000 |
| 0....111 | 0....10000000 |
| ..... | ....... |
| ..... | ....... |
| ..... | ....... |
| 1....111 | 1....00000000 |

The output of the range decoder S ($=S_{N-1}S_{N-2} \ldots S_0$) is obtained by application of the Boolean equation $S_M = (L_0 \text{ OR } L_1 \text{ OR } \ldots \text{ OR } L_M) \text{ AND } (H_{N-1} \text{ OR } H_{N-2} \text{ OR } \ldots \text{ OR } H_m)$ The result is an S that typically looks like 0011 . . . 1110 where the last 1 on the right corresponds to the position of the 1 in L and the last 1 on the left corresponds to the position of the 1 in H. Thus, one obtains a binary word S out of the range decoder which has a central region of is that is bounded by 0's if the 1's do not extend to the word boundaries. The right-side boundary is determined by L and the left-side boundary by H.

The level-1 I/O register array segments 19, 21, and 23 provide the interface between the level-1 IA register arrays 7 and 9 and the "RAMBUS" environment. The I/O register array segments 19, 21, and 23 are comprised of 27, 20, and 17 7-bit registers respectively, there being a total of 64 registers in the three level-1 I/O register array segments to match the 64 registers in each of the level-1 IA register arrays 7 and 9. Each register is composed of real and virtual storage elements just like the registers in level-1 register arrays 7 and 9.

Each real 1-bit storage element in a register has an "input" terminal, an "output" terminal, a "strobe" terminal, and a "reset" terminal. A pulse on the "strobe" terminal causes the bit represented by the signal on the "input" terminal to be stored in the storage element. The "output" terminal provides access to the bit stored in the storage element. A pulse on the "reset" terminal causes a 0 to be stored in the storage element. The virtual storage elements have only "output" terminals.

The "input" and "output" terminals of each real storage element in I/O register array segments 19, 21, and 23 are connected to the two throw terminals of a first SPDT (single-pole, double-throw) switch. The pole terminal of each first SPDT switch is connected to the pole terminal of a second SPDT switch. One throw terminal of the second SPDT switch is connected to a dedicated line in line group 79 consisting of 131 lines, line group 81 consisting of 135 lines, or line group 83 consisting of 119 lines. The other throw terminal is connected to the first throw terminal of a first SP3T (single-pole, 3-throw) switch if the storage element resides in I/O register array segment 19, to the second throw terminal if the storage element resides in array segment 21, and to the third throw terminal if the storage element resides in array segment 23. The pole terminal of the first SP3T switch is connected to a dedicated line in line group 99.

This arrangement permits the real storage element inputs or outputs of I/O register array segments 19, 21, and 23 to be connected either to lines 79, 81, and 83 or to lines 99.

The control lines 101 are defined as follows.

| Line Nos. | Signal | States |
|---|---|---|
| 1 | "read/write" | 0, "read" |
|   |   | 1, "write" |
| 2 | "lines/select" | 0, lines 79, 81, or 83 |
|   |   | 1, lines 99 |
| 3–4 | "segment select" | 00, segment 19 |
|   |   | 01, segment 21 |
|   |   | 10, segment 23 |
| 5–10 | "register select" | 000000, register 0 |
|   |   | 000001, register 1 |
|   |   | ......... |
|   |   | ......... |
|   |   | ......... |
|   |   | 111111, register 63 |
| 11 | "strobe" |   |
| 12 | "reset" |   |

The "read/write" signal controls the first SPDT switch and connects the "output" terminals of the storage elements to a line group if the signal is low. It connects the "input" terminals to a line group if the signal is high.

The "lines select" signal controls the second SPDT switch and connects the "input" or "output" terminals of the storage elements to a line in line groups 79, 81, or 83 if the signal is low. It enables the connection of "input" or "output" terminals to line group 99 if the signal is high.

The "segment select" signal controls the first SP3T switch and connects the storage elements in either array segment 19, array segment 21, or array segment 23 to line group 99.

The "strobe" terminal of each real storage element is connected to the throw terminal of a SPST (single-pole, single-throw) switch. The pole terminal of the SPST switch is connected to the pole terminal of a third SPDT switch. The first throw terminal of the third SPDT switch is connected to the "strobe" line in control line group 101. The second throw terminal of the third SPDT switch is connected to the first throw terminal of a second SP3T switch if the storage element resides in I/O register array segment 19, to the second throw terminal if the storage element resides in array segment 21, and to the third throw terminal if the storage element resides in array segment 23. The pole terminal of the second SP3T switch is connected to the "strobe" line.

The SPST switch is controlled by the "read/write" signal and closes when the "read/write" goes high. The third SPDT switch is controlled by the "lines select" signal. The "strobe" line connects to all real storage elements in I/O register array segments 19, 21, and 23 when the "lines select" signal is low. The second SP3T switch is controlled by the "segment select" signal. The "strobe" signal is routed by the second SP3T switch to those storage elements that reside in the I/O register array segment selected by the "segment select" signal.

The wiring scheme permits the data on lines 79, 81, and 83 to be written into I/O register array segments 19, 21, and 23 simultaneously. The data on lines 99 can be written into only one of the array segments at a time.

The "output" terminals of the real and virtual storage elements of I/O register array segments 19, 21, and 23 are also connected through seven SP64T (single-pole, 64-throw) switches to data lines 103. Each "output" terminal is connected to the N'th throw terminal of the M'th SP64T switch where N is the number of the 7-bit register in which the storage element resides and M is the number of the storage element in the register. The pole terminal of each of the SP64T switches is connected to a dedicated line in data lines 103.

The SP64T switches are controlled by the "register select" signal with the result that the contents of the selected register in I/O register array segments 19, 21, and 23 appear on data lines 103.

All switches in the OSM circuit are implemented using logic gates.

A pulse on the "reset" line of lines 101 causes 0's to be entered into all of the real storage elements of I/O register array segments 19, 21, and 23.

The 32 level-2 I/O register array segments typified by array segments 25, 27, and 29 are read and written to in the same way as array segments 19, 21, and 23. The following differences between the level-1 and the level-2 I/O register array segments should be noted.

The level-2 I/O register array segments typified by array segments 25, 27, and 29 all consist of four 14-bit registers, the storage elements of which are all real. The 32 line groups typified by line groups 93, 95, and 97 consist of 56 lines, one line for each storage element in a register array, as does line group 105.

The control lines 101 that control the operations involving the level-2 I/O register arrays are defined as follows.

| Line Nos. | Signal | States |
|---|---|---|
| 1 | "read/write" | 0, "read" |
|   |   | 1, "write" |
| 2 | "lines select" | 0, line groups typified by |
|   |   | lines 93, 95, and 97 |
|   |   | 1, lines 105 |
| 3–7 | "segment select" | 00000, segment 25 |
|   |   | 00001, segment 27 |
|   |   | ........ |
|   |   | ........ |
|   |   | ........ |
|   |   | 11111, segment 29 |
| 8–14 | "register select" | 0000000, register 0 |
|   |   | 0000001, register 1 |
|   |   | ......... |
|   |   | ......... |
|   |   | ......... |
|   |   | 1111111, register 127 |
| 15 | "strobe" |   |
| 16 | "reset" |   |

The data lines 109 consist of 14 lines, one line for each storage element in a register.

The error control circuit 33 encodes the data received from the level-1 I/O register array segments 19, 21, and 23 for purposes of error control and corrects single errors in 144-bit data blocks retrieved from memory.

Where the data on lines 99 correspond to the contents of array segment 19, only the first 131 lines carry data from array segment 19. Where the data correspond to the contents of array segment 21, the entire 135 lines carry data from array segment 21. And where the data correspond to the contents of array segment 23, only the first 119 lines carry data from array segment 23. In any case, the error control circuit 33 adds an 8-bit error control code to the data read from the entire 135 lines to which it has access. A parity bit across the entire 143 bits (data and error control code) is finally added, the result being a 144-bit data block that is convenient for interfacing with the "RAMBUS" environment.

The parity bit and the 8-bit error control code in a 144-bit data block retrieved from "RDRAM" enables the error control circuit 33 to correct all single errors and detect double errors.

The error control circuit 35 encodes the data received from the level-2 I/O register array segments typified by array segments 25, 27, and 29 for purposes of error control and corrects single errors in 72-bit data blocks retrieved from memory.

The error control circuit 35 always receives 56 bits of data from a level-2 I/O register array segments. The error control circuit adds 8 bits of padding together with a 7-bit error control code that encompasses both data and padding. The addition of a parity bit across the entire 71 bits (data, padding, and error control code) results in a 72-bit block that also interfaces conveniently with the "RAMBUS" environment.

The parity bit and the 7-bit error control code in a 72-bit data block retrieved from "RDRAM" enables the error control circuit 35 to correct all single errors and detect double errors.

The error control process embodied in error control circuits 33 and 35 is fully described by L. Howard Pollard, *Computer Design and Architecture*, Prentice Hall, Englewood Cliffs, N.J., 1990, pp. 58–63.

The error control circuits 33 and 35 interface with the "RDRAM"s 39 and 43 by means of the "RAMBUS" controllers 37 and 41 utilizing buses 111 and 113. It is necessary for both error control circuits to access both "RDRAM"s. Furthermore, it is desirable that level-1 and level-2 codes for a given semi-space be stored in different "RDRAM"s so that the storage or retrieval of such data can be accomplished simultaneously, thereby enabling the OSM circuit to respond to commands in the shortest possible time.

Control lines 115 and 117 each include a "bus assign" line, an "encode/decode" line, a "strobe" line, and an "acknowledge" line.

The "bus assign" line provides the means for assigning the buses 111 and 113 to error control circuits 33 and 35. The "bus assign" signal supplied to error control circuit 33 via lines 115 is the inverse of the "bus assign" signal supplied to error control circuit 35 via lines 117. If the "bus assign" signals for error control circuits 33 and 35 are low and high respectively, error control circuits 33 and 35 will be connected to buses 111 and 113 respectively. If the "bus assign" signals are reversed, then the bus connections will also be reversed. Thus, error control circuits 33 and 35 are always connected to different "RDRAM"s 39 and 43.

If the "encode/decode" line of lines 115 is held low, the error control circuit 33 is instructed to encode the data appearing on lines 99 when a pulse appears on the "strobe" line of lines 115 and to place the encoded data on the bus 111 or 113 to which it is connected. Similarly, if the "encode/decode" line of lines 117 is held low, the error control circuit 35 is instructed to encode the data appearing on lines 105 when a pulse appears on the "strobe" line of lines 117 and to place the encoded data on the bus 111 or 113 to which it is connected.

If the "encode/decode" line of lines 115 is held high, the error control circuit 33 is instructed to decode the data appearing on the bus 111 or 113 to which it is connected when a pulse appears on the "strobe" line of lines 115 and to place the error-corrected data on lines 99. Similarly, if the "encode/decode" line of lines 117 is held high, the error control circuit 35 is instructed to decode the data appearing on the bus 111 or 113 to which it is connected when a pulse appears on the "strobe" line of lines 117 and to place the error-corrected data on lines 105.

The "error alert" lines 119 and 121 are caused to go high by error control circuits 33 and 35 respectively whenever double errors are detected during a decoding operation. The OSM controller 45 acknowledges the receipt of an "error alert" by causing the appropriate "acknowledge" line in lines 115 or 117 to go high. The error control circuits 33 and 35 respond to the "acknowledge" signal by causing the "error alert" line to go low.

The process of storing and retrieving 72-bit and 144-bit blocks of data in "RDRAM"s by means of "RAMBUS" controllers is fully described in literature available from Rambus Inc., 2465 Latham Street, Mountain View, Calif.

The OSM controller 45 controls the operations of the "RAMBUS" controllers 37 and 41 by means of control lines 123 and 125 respectively.

The OSM controller 45 exercises overall control over all of the other circuits that comprise the OSM circuit. In connection with this task, the controller maintains the following registers:

(1) level-1 bank-0 index register, 1 bit;
(2) level-1 bank-1 index register, 1 bit;
(3) level-1 IA-register-array-7 group-number register, 14 bits;
(4) level-1 IA-register-array-9 group-number register, 14 bits;
(5) level-1 I/O-register-array group-number register, 14 bits;
(6) level-1 I/O-array-segment-19 "valid data" register, 1 bit;
(7) level-1 I/O-array-segment-21 "valid data" register, 1 bit;
(8) level-1 I/O-array-segment-23 "valid data" register, 1 bit;
(9) level-2 bank-0 index register, (1 bit);
(10) level-2 bank-1 index register, (1 bit);
(11) level-2 IA-register-array-13 group-number register, 7 bits;
(12) level-2 IA-register-array-15 group-number register, 7 bits;
(13) level-2 I/O-register-array group-number register, 7 bits;
(14) level-2 I/O-array-segment-25 "valid data" register, 1 bit;
(15) level-2 I/O-array-segment-27 "valid data" register, 1 bit;
. . .
. . .
. . .
(45) level-2 I/O-array-segment-29 "valid data" register, 1 bit;
(46) request_group(levels) register array, 14 bits, 7 bits, 1 bit;
(47) request_slot(levels) register array, 6 bits, 7 bits, 6 bits.

By referring to these registers, the OSM controller 45 can determine which banks are associated with which registers, which groups are stored in which register arrays, and which I/O register array segments contain valid data.

The operations performed by the OSM controller depend on the command input. The sequence of operations performed in response to the input of the particular commands listed earlier will be described in detail below. A parameter having a specific value is written in italics.

LOAD(levels,bank,value-1,value-2)
  If levels specifies level-3:
    place bank on "array select" line of control lines 67;
    place a pulse on "reset" line of control lines 67;
      otherwise:
        read the bank index register corresponding to levels and the inverse of bank to determine number of IA register array assigned to the not-specified bank;
        read group number register associated with IA register array to obtain number of group stored in IA register array;
        if group number equals value-1:
          write number of IA register array in bank index register corresponding to levels and bank;
          otherwise:
            clear IA register array corresponding to levels and inverse of index, index being the number stored in bank index register corresponding to the inverse of bank;
            enter value-1 into IA register array group number register;
            enter inverse of index into bank index register corresponding to bank.
  place a 00 on "status" lines 47 signifying that command has been completed.
(If levels equals 0, the above process is performed for all levels at the same time. The number value-1 corresponds to the level-1 group number and value-2 corresponds to the level-2 group number.)

RELOAD(levels,bank,value-1,value-2)
  If group number stored in group number register associated with IA register arrays 7 or 13 corresponding to levels equals value-1:
    enter 0 into bank index register corresponding to levels and bank;
  if group number stored in group number register associated with IA register arrays 9 or 15 corresponding to levels equals value-1:
    enter 1 into bank index register corresponding to levels and bank;
    otherwise:
      read group number register associated with I/O register array corresponding to levels:
    if group number does not equal value-1:
      enter value-1 into I/O-register-array group-number register and enter 0's into all I/O-array-segment "valid data" registers:
        retrieve from "RDRAM" the data corresponding to the group number stored in the I/O-register-array group-number register and pertaining to I/O register array segments for which the segment "valid data" bits are 0;
        enter the retrieved data into the appropriate I/O register array segments, enter 1's into the corresponding segment "valid data" registers, enter inverse of index into bank index register corresponding to bank, index being the number stored in bank index register corresponding to the inverse of bank;
        copy the contents of I/O register array into IA register array corresponding to levels and inverse of index and enter value-1 into IA-register-array group-number register;
  place a 00 or a 10 on "status" lines 47 signifying that command has been completed or cannot be completed.

(If levels equals 0, the above process is performed for level-1 and level-2 at the same time. The number value-1 corresponds to the level-1 group number and value-2 corresponds to the level-2 group number.)

UPDATE(levels,bank,value-1,value-2,value-3)
  If levels equals 0:
    read bank index registers corresponding to bank and levels 1 and 2 to determine IA register array numbers for level 1 and level 2;
    place level-1 IA register array number on "array select" line of control lines 75;
    place level-2 IA register array number on "array select" line of control lines 89;
    place third bit of bank on "array select" line of control lines 67;
    place value for "level-1 low" determined from value-2 (address of first word of object) and value-3 (address of last word of object) on "level-1 low" lines 71;
    place value for "level-1 high" determined from value-2 and value-3 on "level-1 high" lines 73;
    place value for "level-2 low" determined from value-2 and value-3 on "level-2 low" lines 85;
    place value for "level-2 high" determined from value-2 and value-3 on "level-2 high" lines 87;
    place value for "level-3 low" determined from value-2 and value-3 on "level-3 low" lines 63;
    place value for "level-3 high" determined from value-2 and value-3 on "level-3 high" lines 65;
    place level-1 code determined from value-2 on data lines 77;
    place level-2 code determined from value-2 on data lines 91;
    place level-3 code determined from value-2 on data lines 69;
    place pulses on "strobe" line of control lines 75, 89, and 67;
  if levels specifies level 3:
    place first bit of bank on "array select" line of control lines 67;
    place value-2 on "level-3 low" lines 63;
    place value-3 on "level-3 high" lines 65;
    place value-1 on "data" lines 69;
    place a pulse on "strobe" line of control lines 67;
  if levels specifies level 2:
    read bank index register corresponding to level 2 and the first bit of bank to determine IA register array number;
    place level-2 IA register array number on "array select" line of control lines 89;
    place value-2 on "level-2 low" lines 85;
    place value-3 on "level-2 high" lines 87;
    place value-1 on "data" lines 91;
    place a pulse on "strobe" line of control lines 89;
  if levels specifies level 1:
    read bank index register corresponding to level 1 and the first bit of bank to determine IA register array number;
    place level-1 IA register array number on "array select" line of control lines 75;
    place value-2 on "level-1 low" lines 71;
    place value-3 on "level-1 high" lines 73;
    place value-1 on "data" lines 77;
    place a pulse on "strobe" line of control lines 75;

place a 00 on "status" lines 47 signifying that command has been completed.

WRITEBACK(levels,bank)

If levels equals 0:

read bank index registers corresponding to bank and levels 1 and 2 to determine IA register array numbers for level 1 and level 2;

place level-1 IA register array number on "array select" line of control lines 75;

place level-2 IA register array number on "array select" line of control lines 89;

copy contents of selected level-1 IA register array 7 or 9 into level-1 I/O register arrays 19, 21, and 23 and copy group number stored in IA-register-array group-number register into I/O-register-array group-number register;

copy contents of selected level-2 IA register array 13 or 15 into level-2 I/O register arrays typified by arrays 25, 27, and 29 and copy group number stored in IA-register-array group-number register into I/O-register-array group-number register;

copy contents of level-1 and level-2 I/O register arrays into "RDRAM"S 39 and 43 at locations prescribed by group numbers stored in respective I/O-register-array group-number registers;

otherwise:

read bank index register corresponding to levels and first bit of bank to determine IA register array number;

place IA register array number on "array select" line of control lines 75 or 89 depending on levels;

copy contents of selected IA register array into I/O register array and copy group number stored in IA-register-array group-number register into I/O-register-array group-number register;

copy contents of I/O register array into "RDRAM" at locations prescribed by group number stored in I/O-register-array group-number registers;

place a 00 on "status" lines 47 signifying that command has been completed.

REQUEST(levels,value-1,value-2)

Copy value-1 into request_group(levels) register and copy value-2 into request_slot(levels) register;

If levels=1 or 2:

if request_group(levels) equals the value stored in either of the levels IA-register-array group-number registers or if request_group(levels) equals the value stored in the levels I/O-register-array group-number register and a 1 is stored in the segment "valid data" register associated with the segment containing the slot numbered request_slot(levels):

do nothing;

if request_group(levels) equals the value stored in the levels I/O-register-array group-number register and the segment "valid data" register associated with the segment containing the slot numbered request_slot(levels) equals 0:

copy the segment from "RDRAM" into the I/O register array segment and enter a 1 into the segment "valid data" register;

otherwise:

copy request_group(levels)into the levels I/O-register-array group-number register and enter 0's into the segment "valid data" registers associated with the I/O register array segments;

copy the segment containing the slot numbered request_slot(levels) from "RDRAM" into the appropriate I/O register array segment and enter a 1 into the associated segment "valid data" register;

if levels equals 0:

determine the group number and slot number corresponding to value-1 for all levels, value-1 being the address of a word in an object;

store group numbers in request_group(levels) register array and store slot numbers in request_slot(levels) register array;

if request_group(1) equals the value stored in either of the level-1 IA-register-array group-number registers or if request_group(1) equals the value stored in the level-1 I/O-register-array group-number register and a 1 is stored in the segment "valid data" register associated with the segment containing the slot numbered request_slot(1):

do nothing;

if request_group(1) equals the value stored in the level-1 I/O-register-array group-number register and the segment "valid data" register associated with the segment containing the slot numbered request_slot(1) equals 0:

copy the segment from "RDRAM" into the I/O register array segment and enter a 1 into the segment "valid data" register;

otherwise:

copy request_group(1) into the level-1 I/O-register-array group-number register and enter 0's into the segment "valid data" registers associated with the I/O register array segments;

copy the segment containing the slot numbered request_slot(1) from "RDRAM" into the appropriate I/O register array segment and enter a 1 into the associated segment "valid data" register;

if request_group(2) equals the value stored in either of the level-2 IA-register-array group-number registers or if request_group(2) equals the value stored in the level-2 I/O-register-array group-number register and a 1 is stored in the segment "valid data" register associated with the segment containing the slot numbered request_slot(2):

do nothing;

if request_group(2) equals the value stored in the level-2 I/O-register-array group-number register and the segment "valid data" register associated with the segment containing the slot numbered request_slot(2) equals 0:

copy the segment from "RDRAM" into the I/O register array segment and enter a 1 into the segment "valid data" register;

otherwise:

copy request_group(2) into the level-2 I/O-register-array group-number register and enter 0's into the segment "valid data" registers associated with the I/O register array segments;

copy the segment containing the slot numbered request_slot(2) from "RDRAM" into the appropriate I/O register array segment and enter a 1 into the associated segment "valid data" register;

place a 00 or 10 on "status" lines 47 signifying that command has been completed or cannot be completed.

FETCH(levels)

If levels=0:

wait until codes corresponding to request_group(1), request_slot(1) and request_group(2), request_slot(2) are available in the IA and I/O register arrays;

copy codes corresponding to request_group(1), request_slot(1) request_group(2), request_slot(2), and request_group(3), request_slot(3) in the IA and I/O register arrays into temporary registers;

determine header address from codes stored in temporary registers;

place header address on "value-1" lines 51;

if levels=1 or 2:

wait until code corresponding to request_group(levels) and request_slot(levels) is available in an IA or I/O register array;

retrieve code and place on "value-1" lines 51;

if levels=3:

retrieve code corresponding to request_group(levels) and request_slot(levels) from IA register array and place on "value-1" lines 51;

place a 00 or 10 on "status" lines 47 signifying that command has been completed or cannot be completed.

RESET

Initialize OSM controller 45 and clear level-1 IA register arrays 7 and 9, level-2 IA register arrays 13 and 15, level-1 I/O register arrays 19, 21, and 23, and level-2 I/O register arrays typified by arrays 25, 27, and 29.

The OSM controller 45 is conventionally implemented with counters for timing the required operations and gate arrays for performing the switching functions and the logical operations.

The preferred embodiment is described in terms of a particular combination of register arrays and DRAM's. It will be recognized by one skilled in the art that the essence of the invention can be realized by many other memory structures.

The preferred embodiment also utilizes a specific 3-level coding scheme. It will also be recognized by one skilled in the art that many variations of the preferred coding scheme could be used including a different number of encoding levels, different numbers of addresses included in groups, a different way of incorporating the "valid data" indicator into the codes, and a different way of formatting the codes.

What is claimed is:

1. An object space manager circuit comprising:

a code memory for storing a plurality of code words for a plurality of encoding levels, the addresses of the code words for each encoding level being denoted by an ordered sequence of integers beginning with 0, a 0 being stored initially at each memory address;

a means for entering simultaneously into the code memory at a plurality of addresses a code word for each of a plurality of encoding levels, the addresses for each level being those included within a specified beginning address and a specified ending address, the code words, the encoding levels, the beginning addresses, and the ending addresses being supplied through an input port.

2. The object space manager circuit of claim 1 further comprising:

a means for retrieving a code word at a specified address in the code memory for at least one encoding level, the specified address of the code word for each level to be retrieved being supplied through an input port, the retrieved code words being accessible at an output port.

3. The object space manager circuit of claim 1 wherein the code memory comprises:

an array of registers for each encoding level, the code-entering means performing its code-entering function on each array;

at least one random access memory (RAM) for storing a plurality of the code words;

a controlling means for transferring the data stored in at least one register array to a RAM and for transferring the data for a selected range of addresses in a RAM to at least one register array, the selected range of addresses intended for the at least one register array being so determined by the controlling means as to include for at least one encoding level the range of addresses from the specified beginning address to the specified ending address.

4. The object space manager circuit of claim 2 wherein the code memory comprises:

an array of registers for each encoding level, the code-entering means and the code-retrieving means performing their respective functions on each array;

at least one random access memory (RAM) for storing a plurality of the code words;

a controlling means for transferring the data stored in at least one register array to a RAM and for transferring the data for a selected range of addresses in a RAM to at least one register array, the selected range of addresses intended for the at least one register array being so determined by the controlling means as to include for at least one encoding level the range of addresses from the specified beginning address to the specified ending address when the code-entering function is being performed, the selected range of addresses intended for the at least one register array being so determined by the controlling means as to include for the at least encoding level the specified address of the code word to be retrieved when the code-retrieving function is being performed.

5. The object space manager circuit of claim 1 further comprising:

a means for determining the code word to be associated with each word of an object in object memory for each of Lmax encoding levels and the addresses in code memory at which the code word is to be stored, the code words being decodable into the address A of the first object word, Lmax being a predetermined integer, the encoding levels being denoted by the integers 1, 2, . . . , Lmax, the code word for level L being equal to [A modulo $G_L+G_L$] for all object-word addresses B for which INT($B/G_L$) equals INT($A/G_L$) and INT($B/G_{L-1}$) does not equal INT($A/G_{L-1}$), the code word for level L being entered at addresses [INT($A/G_{L-1}$)+1] to [INT($BL/G_{L-1}$)], $B_L$ being the highest object word address for which INT($B/G_L$) equals INT($A/G_L$), the expression INT() denoting the integer portion of the quantity in parentheses, addresses in object memory being placed in contiguous groups at each encoding level, $G_L$ being the number of object memory addresses in each group for level L, $G_0$ being equal to 1, $G_L$ being greater than $G_{L-1}$, $G_L$ at the highest level being equal to the total number of object memory addresses, the first-object-word address and the last-object-word address being provided through an input port, the code word, the beginning address, and the ending address for each encoding level being supplied to the code-entering means through the input port of the code-entering means.

6. The object space manager circuit of claim 2 wherein the code-entering means enters a code word into code memory for each word of an object in object memory for each of Lmax encoding levels, Lmax being a predetermined integer, the encoding levels being denoted by the integers 1, 2, . . . , Lmax, the code word corresponding to object-word address B and level L being stored in the L-level section of code memory at address $INT(B/G_{L-1})$, $G_L$ being a predetermined number for each level L, the object space manager circuit further comprising:

a means for determining the addresses of the codes to be retrieved from code memory from an object-word address B, the addresses of the codes being given by the expression $INT(B/G_{L-1})$, the object-word address being obtained through an input port, the addresses of the codes being supplied to the code-retrieving means through the input port of the code-retrieving means.

7. The object space manager circuit of claim 2 wherein the code-entering means enters a code word into code memory for each word of an object in object memory for each of Lmax encoding levels, Lmax being a predetermined integer, the encoding levels being denoted by the integers 1, 2, ..., Lmax, the object space manager circuit further comprising:

a means for determining the address of the first object word from the code words obtained by the code-retrieving means and the address C of the level-1 code word, the first-object-word address being equal to $[INT(C/G_L)+\text{level-L code word}-G_L]$, L being the number of the lowest level for which the level-L code word is greater than $G_L$, $G_L$ being a predetermined integer for each level L, the code word for the lowest level having a value greater than $G_L$ and the address of the level-1 code word C being provided by the code-retrieving means through an input port, the first-object-word address being accessible at an output port.

8. A process for facilitating the management of object space using a code memory for storing a plurality of code words for a plurality of encoding levels, the addresses of the code words for each encoding level being denoted by an ordered sequence of integers beginning with 0, a 0 being stored initially at each memory address, the process comprising the step:

entering simultaneously into the code memory at a plurality of addresses a code word for each of a plurality of encoding levels, the addresses for each level being those included within a specified beginning address and a specified ending address.

9. The process of claim 8 comprising the additional step:

retrieving a code word at a specified address in the code memory for at least one encoding level.

10. The process of claim 8 comprising the additional step:

determining the code word to be associated with each word of an object in object memory for each of Lmax encoding levels and the addresses in code memory at which the code word is to be stored, the code words being decodable into the address A of the first object word, Lmax being a predetermined integer, the encoding levels being denoted by the integers 1, 2, ..., Lmax, the code word for level L being equal to [A modulo $G_L+G_L$] for all object-word addresses B for which $INT(B/G_L)$ equals $INT(A/G_L)$ and $INT(B/G_{L-1})$ does not equal $INT(A/G_{L-1})$, the code word for level L being entered at addresses $[INT(A/G_{L-1})+1]$ to $[INT(B_L/G_{L-1})]$, $B_L$ being the highest object word address for which $INT(B/G_L)$ equals $INT(A/G_L)$, the expression INTO denoting the integer portion of the quantity in parentheses, addresses in object memory being placed in contiguous groups at each encoding level, $G_L$ being the number of object memory addresses in each group for level L, $G_0$ being equal to 1, $G_L$ being greater than $G_{L-1}$, $G_L$ at the highest level being equal to the total number of object memory addresses, the code-determining step being performed prior to performing the code-entering step.

11. The process of claim 9 wherein during the code-entering step a code word is entered into code memory for each word of an object in object memory for each of Lmax encoding levels, Lmax being a predetermined integer, the encoding levels being denoted by the integers 1, 2, ..., Lmax, the code word corresponding to object-word address B and level L being stored in the L-level section of code memory at address $INT(B/G_{L-1})$, $G_L$ being a predetermined number for each level L, the process comprising the additional step:

determining the addresses of the codes to be retrieved from code memory from an object-word address B, the addresses of the codes being given by the expression $INT(B/G_{L-1})$, the address-determining step being performed prior to performing the code-retrieving step.

12. The process of claim 9 wherein during the code-entering step a code word is entered into code memory for each word of an object in object memory for each of Lmax encoding levels, Lmax being a predetermined integer, the encoding levels being denoted by the integers 1, 2, ..., Lmax, the process comprising the additional step:

determining the address of the first object word from the code words obtained by the code-retrieving means and the address C of the level-1 code word, the first-object-word address being equal to $[INT(C/G_L)+\text{level-L code word}-G_L]$, L being the number of the lowest level for which the level-L code word is greater than $G_L$, $G_L$ being a predetermined integer for each level L.

13. An apparatus for the practice of the process of claim 8.

14. An apparatus for the practice of the process of claim 9.

15. An apparatus for the practice of the process of claim 10.

16. An apparatus for the practice of the process of claim 11.

17. An apparatus for the practice of the process of claim 12.

* * * * *

UNITED STATES PATENT AND TRADEMARK OFFICE
CERTIFICATE OF CORRECTION

PATENT NO : 6,138,202
DATED : Oct. 24, 2000
INVENTOR(S) : Kelvin D. Nilsen

It is certified that error appears in the above-identified patent and that said Letters Patent is hereby corrected as shown below:

In claim 5, line 46, "BL" should read -- $B_L$ --.

In claim 10, line 6, "INTO" should read -- INT( ) --.

Signed and Sealed this

First Day of May, 2001

Attest:

NICHOLAS P. GODICI

Attesting Officer     Acting Director of the United States Patent and Trademark Office